(12) United States Patent
Tsui et al.

(10) Patent No.: US 12,514,537 B2
(45) Date of Patent: Jan. 6, 2026

(54) NON-INVASIVE ULTRASOUND DETECTION DEVICE FOR LIVER FIBROSIS AND METHOD THEREOF

(71) Applicant: CHANG GUNG UNIVERSITY, Taoyuan (TW)

(72) Inventors: Po-Hsiang Tsui, Taoyuan (TW); Dar-In Tai, Taoyuan (TW)

(73) Assignee: CHANG GUNG UNIVERSITY, Taoyuan (TW)

( * ) Notice: Subject to any disclaimer, the term of this patent is extended or adjusted under 35 U.S.C. 154(b) by 118 days.

(21) Appl. No.: 18/228,085

(22) Filed: Jul. 31, 2023

(65) Prior Publication Data

US 2023/0380798 A1 Nov. 30, 2023

Related U.S. Application Data

(63) Continuation-in-part of application No. 17/497,281, filed on Oct. 8, 2021, now abandoned.

(30) Foreign Application Priority Data

May 11, 2021 (TW) .................................. 110116979

(51) Int. Cl.
*A61B 8/08* (2006.01)
*G01S 7/52* (2006.01)

(52) U.S. Cl.
CPC .......... *A61B 8/085* (2013.01); *G01S 7/52036* (2013.01)

(58) Field of Classification Search
CPC ......... A61B 8/085; A61B 8/08; A61B 8/5207; A61B 8/5223; G01S 7/52036
See application file for complete search history.

(56) References Cited

U.S. PATENT DOCUMENTS

| | | | | |
|---|---|---|---|---|
| 2015/0148671 | A1* | 5/2015 | Chen | G06T 7/0012 600/438 |
| 2016/0012583 | A1* | 1/2016 | Cales | G06T 7/11 382/128 |
| 2021/0304890 | A1* | 9/2021 | Calès | G16B 40/00 |
| 2021/0374956 | A1* | 12/2021 | Zheng | G16H 30/40 |

* cited by examiner

*Primary Examiner* — Kaitlyn E Sebastian
(74) *Attorney, Agent, or Firm* — Troutman Pepper Locke LLP; Tim Tingkang Xia, Esq.

(57) ABSTRACT

A non-invasive ultrasound detection device for detecting liver fibrosis and method thereof is disclosed. The method includes the steps of: creating a discriminant function of several parameters, each with a weight obtained by LDA, based on a database; and determining the degree of liver fibrosis by comparing a reference value and a numerical value calculated from the discriminant function. The parameters represent different probability distribution functions capable of identifying liver fibrosis or fatty liver. In the step of creating a discriminant function, the database provides the processed data based on numerous ultrasound images of patents' livers for LDA. In the step of determining the degree of liver fibrosis, the processed data based on ultrasound images of a person's liver are obtained for further calculation of the numerical value. The processed data includes an average value for each probability distribution function within an area corresponding to a liver.

8 Claims, 5 Drawing Sheets

NON-INVASIVE ULTRASOUND DETECTION DEVICE FOR LIVER FIBROSIS AND METHOD THEREOF

CROSS-REFERENCE TO RELATED APPLICATION

This application is a Continuation-in-part (CIP) application of U.S. application Ser. No. 17/497,281, filed on Oct. 8, 2021, which itself claims priority of Taiwanese Application No. 110116979, filed on May 11, 2021. The disclosure of each of the above applications is incorporated herein in its entirety by reference.

BACKGROUND OF THE INVENTION

Field of the Invention

The present invention relates to a non-invasive ultrasound detection device and method for detection of liver fibrosis, in particular to a non-invasive ultrasound detection device and method for judging the degree of liver fibrosis in patients with significant fatty liver.

DESCRIPTION OF THE PRIOR ART

Liver fibrosis is a common liver parenchymal disease caused by liver inflammation, and conventional liver fibrosis diagnosis utilizes ultrasound (or ultrasonic) elastography technology, which is a non-invasive way to measure the mechanical properties of soft tissues. Although it is a clinical means to look at liver fibrosis by ultrasound elastography, liver inflammation may increase liver stiffness and induce false positive results for liver fibrosis evaluation. Therefore, there will be some errors caused by liver inflammation when using ultrasound elastography to quantify the degree of liver fibrosis. In addition, if the patient has fatty liver, it is also an unfavorable condition for diagnosis by ultrasound elastography.

To prevent ultrasound measurements from being affected by liver inflammation, past studies have pointed out that statistical analysis of ultrasound scattering signals can effectively reduce the dependence of measurement results on liver inflammation. Ultrasound scattering signals are produced because the liver parenchyma is composed of many hepatocytes and small blood vessels, so they can be regarded as a model composed of many scatterers. When liver parenchymal fibrosis occurs, it is equivalent to adding additional scatterers to the original large number of scatterers in the liver, causing the original scatter structure of the liver to change, which in turn causes the statistical characteristics of the ultrasound scattering signal to change. In the past, there were numerous methods that could be used to describe the statistical characteristics of ultrasound scattering signals. The conventional methods include the Nakagami statistical model, the homodyned K statistical model, and entropy in information theory.

However, among many patients suffering from liver fibrosis, some patients have fatty liver due to obesity and metabolic syndrome, and then liver inflammation and subsequent fibrosis develop due to fatty infiltration. For patients with fatty liver, the fat-infiltrated hepatocytes will strongly dominate the formation of ultrasound scattering signals, which makes the statistical analysis methods of the past known techniques lose effectiveness in the quantitative classification of fibrosis, so how to invent an ultrasound detection technology that can solve the difficulties of liver fibrosis diagnosis in patients with fatty liver is currently a top priority.

SUMMARY OF THE INVENTION

In view of this, the present invention provides a non-invasive ultrasound detection device for detecting liver fibrosis, including: a non-invasive ultrasound apparatus that detects a liver and generates an envelope signal; a parameter value generation model group that uses a sliding window technology to divide the envelope signal into a plurality of small blocks, and generate a plurality of Nakagami parameter values, homodyned K parameter values, and information theory entropy parameter values according to the data in each small block. The non-invasive ultrasound detection device also includes: a parameter calculation module having a built-in U-net model trained to identify a liver parenchymal area and calculate an individual average value of the Nakagami parameter values, the homodyned K parameter values, and the information theory entropy parameter values in the liver parenchymal area; and a classification module containing a discriminant function provided by a data training module. Three variables representing the Nakagami parameter, the homodyned K parameter, and the information theory entropy parameter are multiplied by different weights and then summed to obtain the discriminant function. The average value of the Nakagami parameters, the average value of the homodyned K parameters, and the average value of the information theoretical entropy parameters calculated by the parameter calculation module are substituted into the discriminant function to generate anew parameter value. If the new parameter value is higher than a set threshold, it is judged as non-fibrotic; if it is lower than the set threshold, it is judged as fibrosis.

In an embodiment, the data training module individually averages the Nakagami parameter values, the homodyned K parameter values, and the information theory entropy parameter values of a plurality of tested individuals with known degrees of liver fibrosis, and performs linear discriminant analysis to obtain respective weight parameters for the Nakagami parameter, the homodyned K, and the information theory entropy parameter for the discriminant function.

In an embodiment, the information theory entropy parameter is normalized.

An embodiment of the present invention comprises a non-invasive ultrasound detection method for detecting liver fibrosis, including the following steps: providing a discriminant function composed of three variables including a Nakagami parameter, a homodyned K parameter, and an information theory entropy parameter. The parameters are multiplied by different weights and then combined. The method also includes the following steps of: using a non-invasive ultrasound apparatus to detect a liver and generate an envelope signal; using a sliding window technology to divide the envelope signal into a plurality of small blocks, and generate multiple Nakagami parameter values, homodyned K parameter values, and information theory entropy parameter values based on the data in each small block; using a trained U-net model to identify a liver parenchymal area and calculate the individual average values of the Nakagami parameter values, the homodyned K parameter values, and the information theory entropy parameter values in the liver parenchymal region; and substituting the calculated average value of the Nakagami parameter values, the average value of the homodyned K parameter values, and the average value of the information theory entropy parameter values into the discriminant function to generate a new parameter value. If the new parameter value is higher than a set threshold, it is judged as non-fibrotic; if it is lower than the set threshold, it is judged as fibrosis.

In an embodiment, the discriminant function is obtained by performing linear discriminant analysis to obtain respective weight parameters for the Nakagami parameter, the homodyned K parameter, and the information theory entropy parameter, based on the average value of the Nakagami parameter values, the average value of the homodyned K parameter values, and the average value of the information theory entropy parameter values of a plurality of measured individuals with known degrees of liver fibrosis.

In an embodiment, the information theory entropy parameter is normalized.

In an embodiment, the present invention comprises a non-invasive ultrasound detection method for detecting liver fibrosis, which includes a step of obtaining a discriminant function. In this step, the individual average values of different statistical model parameter values in the liver parenchymal area are calculated according to liver ultrasound images of multiple tested subjects with known degrees of liver fibrosis. Then, linear discriminant analysis is used to obtain the individual weights of different statistical model parameters to obtain a discriminant function. The discriminant function is obtained by multiplying the variables representing the different statistical model parameters by the individual weights. It is combined by summation, in which different statistical models are used to identify liver fibrosis or fatty liver. The method also includes a step of calculating the individual average values of the different statistical model parameter values in the liver parenchymal area according to the liver ultrasound image of a subject, and substituting them into the discriminant function to generate a new parameter value, and compared it with a set threshold value to judge whether there is liver fibrosis.

In an embodiment, at least one of the statistical model parameters is normalized.

DESCRIPTION OF THE PREFERRED EMBODIMENTS

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term "code", as used herein, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The term "interface", as used herein, generally refers to a communication tool or means at a point of interaction between components for performing data communication between the components. Generally, an interface may be applicable at the level of both hardware and software, and may be uni-directional or bi-directional interface. Examples of physical hardware interface may include electrical connectors, buses, ports, cables, terminals, and other I/O devices or components. The components in communication with the interface may be, for example, multiple components or peripheral devices of a computer system.

The terms "chip" or "computer chip", as used herein, generally refer to a hardware electronic component, and may refer to or include a small electronic circuit unit, also known as an integrated circuit (IC), or a combination of electronic circuits or ICs.

In the following exemplary embodiments of the invention, the non-invasive ultrasound detection device for detecting liver fibrosis or the non-invasive ultrasound detection method for detecting liver fibrosis is implemented by a computer or computing devices. The computing devices may be machines used to acquire, store, analyze, process, and publish data and other information electronically, including accessories (or "peripherals") for printing, transmitting and receiving, or storing electronic information.

The clinical research results of the present invention show that in the patient population with fatty liver, it is found that the parameters of the Nakagami statistical model and the homodyned K statistical model are correlated with the degree of liver fibrosis; and the information theory entropy is highly correlated with fatty infiltration of the liver. In other words, combining the parameters of the Nakagami statistical model, the homodyned K statistical model, and the Shannon entropy of information theory can diagnose whether the patient has fatty liver and further quantify the degree of liver fibrosis. Nakagami statistical model parameters and homodyned K statistical model parameters are responsible for providing fibrosis information, and the information theory Shannon entropy can provide liver fat infiltration information. Combining the above three parameters into a single parameter can inherit the ability of each parameter to look at liver fibrosis and fatty liver, which is helpful for the diagnosis of liver fibrosis in fatty liver patients.

Furthermore, liver ultrasound images provide raw data for calculating parameters of the Nakagami statistical model, the homodyned K statistical model, and the Shannon entropy of the information theory. After calculating the three parameters, the linear discriminant analysis (LDA) is performed to generate the effectiveness weights of the three parameters. A new parameter is generated by multiplying the respective parameters by the weights. This new parameter can be used to classify the degree of liver fibrosis in patients with fatty liver.

Figure 1:
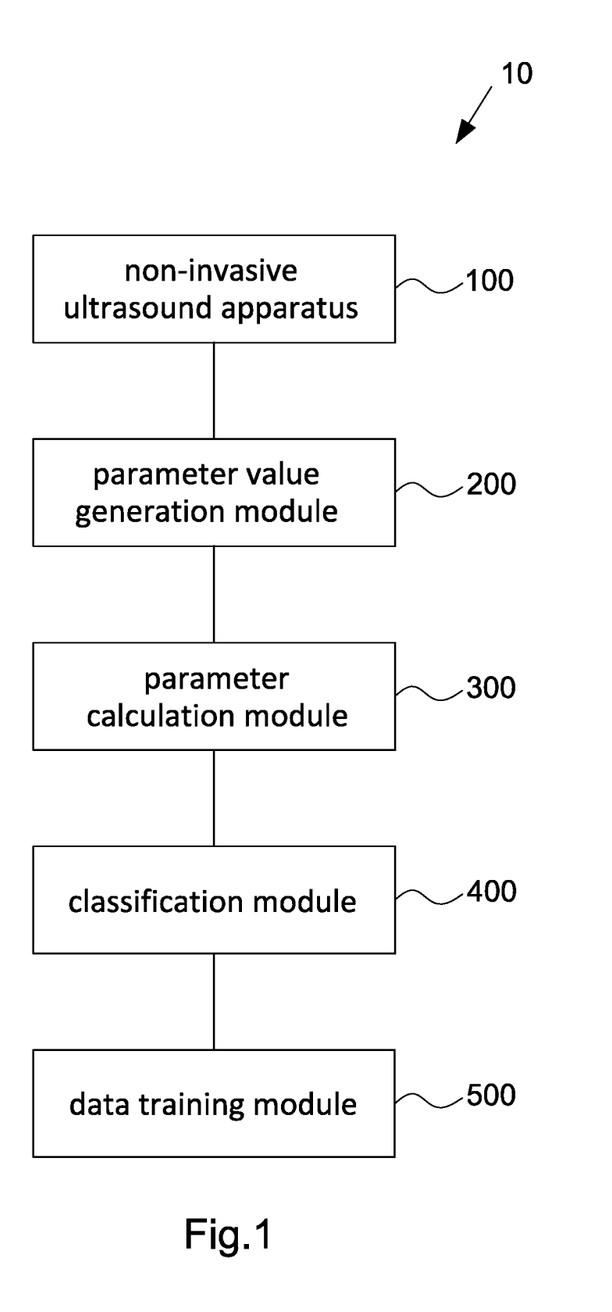
FIG. 1 is a drawing showing a non-invasive ultrasound detector for detecting liver fibrosis in an embodiment of the present invention.

Please refer to FIG. 1 which is a drawing illustrating a device for non-invasive ultrasound detection of liver fibrosis. As shown in FIG. 1, the non-invasive ultrasound detection device 10 includes a non-invasive ultrasound (or ultrasonic) apparatus 100, a parameter value generation module 200, a parameter calculation module 300, a classification module 400, and a data training module 500.

Figure 4:
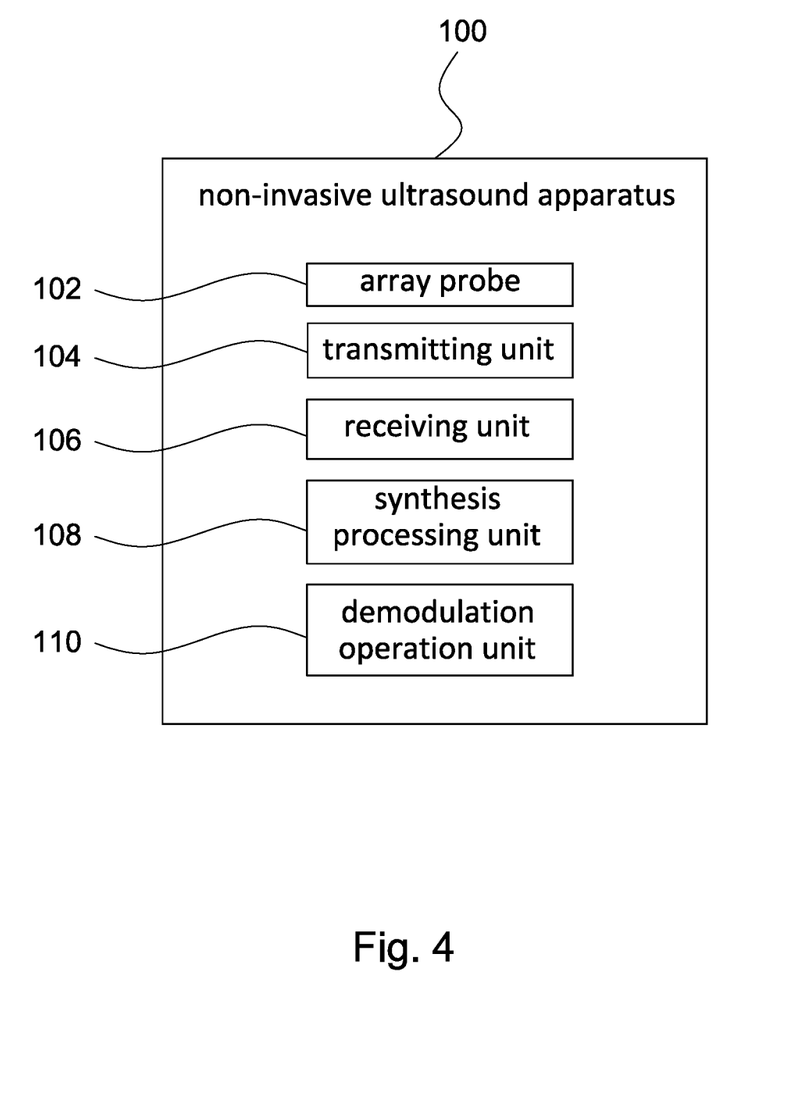
FIG. 4 is a drawing showing a non-invasive ultrasound apparatus that an embodiment of the present invention incorporates.

Further referring to FIG. 4, FIG. 4 is a drawing showing a non-invasive ultrasound apparatus that an embodiment of the present invention incorporates. As shown in FIG. 4, the non-invasive ultrasound apparatus 100 is, for example, a commercially available ultrasound device for detecting liver fibrosis, which at least includes an array probe 102, a transmitting unit 104, a receiving unit 106, a synthesis processing unit 108, and a demodulation operation unit 110. The transmitting unit 104, for example, is a transmitter configured to transmit an ultrasound wave to a liver parenchymal region. The receiving unit 106, for example, is a receiver configured to receive a complex echo signal reflected by the ultrasound wave. In certain embodiments, the transmitting unit 104 and the receiving unit 106 may be implemented as a transceiver (i.e., a combination of a transmitter/receiver). The synthesis processing unit 108, for example, is a modulator that is a device or circuit performing modulation. The demodulation operation unit 110, for example, is a demodulator that is an electronic circuit (or computer program in a software-defined radio) used to recover the information content from the modulated carrier wave. In another embodiment, the synthesis processing unit 108 and the demodulation operation unit 110 can be integrated as a single unit that performs both modulation and demodulation; that is, such a single unit synthesizes and demodulates the complex echo signal to generate the envelope signal. In details, the non-invasive ultrasound apparatus 100 detects (or scans) a liver through the array probe 102, transmits an ultrasound wave through transmitting unit 104 to the liver parenchymal area, and continuously receives the complex echo signals reflected by the ultrasound waves through the receiving unit 106, and synthesizes and demodulates the complex echo signals through the synthesis processing unit 108 and the demodulation operation unit 110 to generate an envelope signal, the so-called original signal (or raw data) before ultrasound gray-scale imaging.

Figure 5:
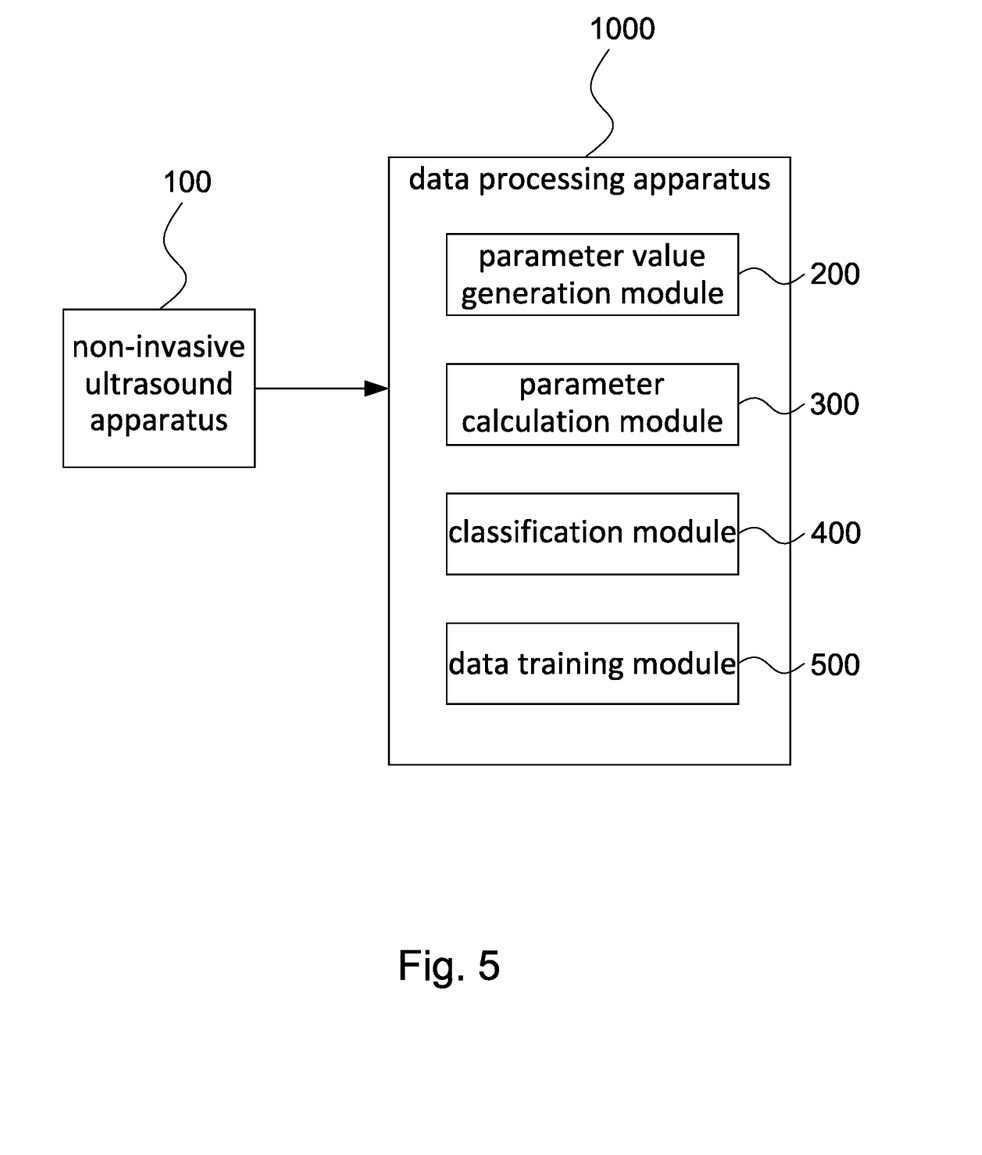
FIG. 5 is a drawing showing a data processing apparatus that an embodiment of the present invention incorporates.

Referring to FIG. 1, FIG. 4 and FIG. 5 again, the non-invasive ultrasound apparatus 100 is electrically connected to the data processing apparatus 1000. In the non-invasive ultrasound detection device 10, the non-invasive ultrasound apparatus 100 detects a liver and generates an envelope signal. In the non-invasive ultrasound detection device 10, the data processing apparatus 1000 is programmed to perform the parameter value generation module 200, the parameter calculation module 300, the classification module 400, and the data training module 500. As shown in FIG. 5, the non-invasive ultrasound apparatus 100 provides the data processing apparatus 1000 with the envelope signal, the so-called original signal (or raw data).

As shown in FIG. 5, in the data processing apparatus 1000, the parameter value generation module 200 uses a sliding window technology to divide the envelope signal from the non-invasive ultrasound apparatus 100 into a plurality of small blocks, and uses different statistical models according to the data in each small block to generate a plurality of Nakagami parameter values, homodyned K parameter values, and information theory entropy parameter values which are sent to the parameter calculation module 300 to calculate the individual average values. The above-mentioned parameter values are basically a parameter matrix, which is a so-called parameter image after color matching.

As shown in FIG. 5, in the data processing apparatus 1000, the parameter calculation module 300 communicates with the parameter value generation module 200 and is built with a trained deep learning model such as a U-net model to identify a liver parenchymal region and calculate the individual average values of the Nakagami parameter values, the homodyned K parameter values, and the information theory entropy parameter values in the liver parenchymal region. In other embodiments, other deep learning models and other statistical models are used.

As shown in FIG. 5, in the data processing apparatus 1000, the classification module 400 contains a discriminant function. The discriminant function is composed of three variables representing the Nakagami parameter, the homodyned K parameter, and the information theory entropy parameter, each multiplied by different weights and then added together, for example: (Nakagami parameter×weight 1)+(homodyned K parameter×weight 2)+(information theory entropy parameter×weight 3). In an embodiment, the weights 1 to 3 are all known and provided by the data training module 500. Then, the average value of the Nakagami parameter values, the average value of the homodyned K parameter values, and the average value of the information theory entropy parameter values calculated by the parameter calculation module are substituted into the discriminant function to generate a new parameter value. If the new parameter value is higher than a set threshold, it is judged as no fibrosis detected, and if it is lower than the set threshold, it is judged as fibrosis detected. The new test judgment data added by the classification module 400 can be sent to the data training module 500, so that the data training module 500 uses linear discriminant analysis to obtain the corrected weights 1~3 based on the accumulated large amount of data. The discriminant function is updated and fed back to the classification module 400 to improve the accuracy of the judgment.

As shown in FIG. 5, in the data processing apparatus 1000, the data training module 500 uses a large amount of ultrasound image envelope data with known liver fibrosis scores to obtain the corresponding average values of the Nakagami parameter values, the homodyned K parameter values, and the information theory entropy parameter values through the parameter value generation module 200 and the parameter calculation module 300. The afore-mentioned average values also correspond to different liver fibrosis score (please refer to FIG. 2) and serve as reference for classification of diagnostic results. For example, "normal" means no fibrosis; "F1" means 1 point for fibrosis; "F2" means 2 points for fibrosis; "F3" means 3 points for fibrosis; "F4" means liver cirrhosis as a diagnostic label basis. The weights 1~3 of the Nakagami parameter, the homodyned K parameter, and the information theory entropy parameter are obtained by linear discriminant analysis until the discriminant function is established. The classification module 400 uses the discriminant function to determine the degree of liver fibrosis for the tested fatty liver patients.

In an embodiment, in order to establish the above-mentioned discriminant function, the non-invasive ultrasound apparatus 100 is used to obtain the envelope signal for 65 liver ultrasound image data of significant fatty liver patients with known liver fibrosis scores. Then the parameter value generation module 200 uses a sliding window technology to divide the envelope signal into a plurality of small blocks, and uses different statistical models according to the data in each small block to generate a plurality of Nakagami parameter values, homodyned K parameter values, and information theory entropy parameter values. Then, the parameter calculation module 300 uses the trained U-net model to identify a liver parenchymal region, and calculates the individual average values of the plurality of Nakagami parameter values, the plurality of homodyned K parameter values, and the plurality of information theory entropy parameter values in the liver parenchymal region. Finally, the obtained average value of the Nakagami parameter values, the average value of the homodyned K parameter values, and the average value of the information theory entropy parameter values, together with the corresponding liver fibrosis diagnostic scores of each patient (ie. the aforementioned 65 significant fatty liver cases), are used to perform a linear discriminant analysis before obtaining weights 1 to 3 and generating a discriminant function. The classification module 400 uses this discriminant function to calculate new parameters, and the classification accuracy can reach 90.8% in the case of classifying the presence or absence of liver fibrosis. Next, it will be further explained with reference to FIG. 2 as follows.

Figure 2:
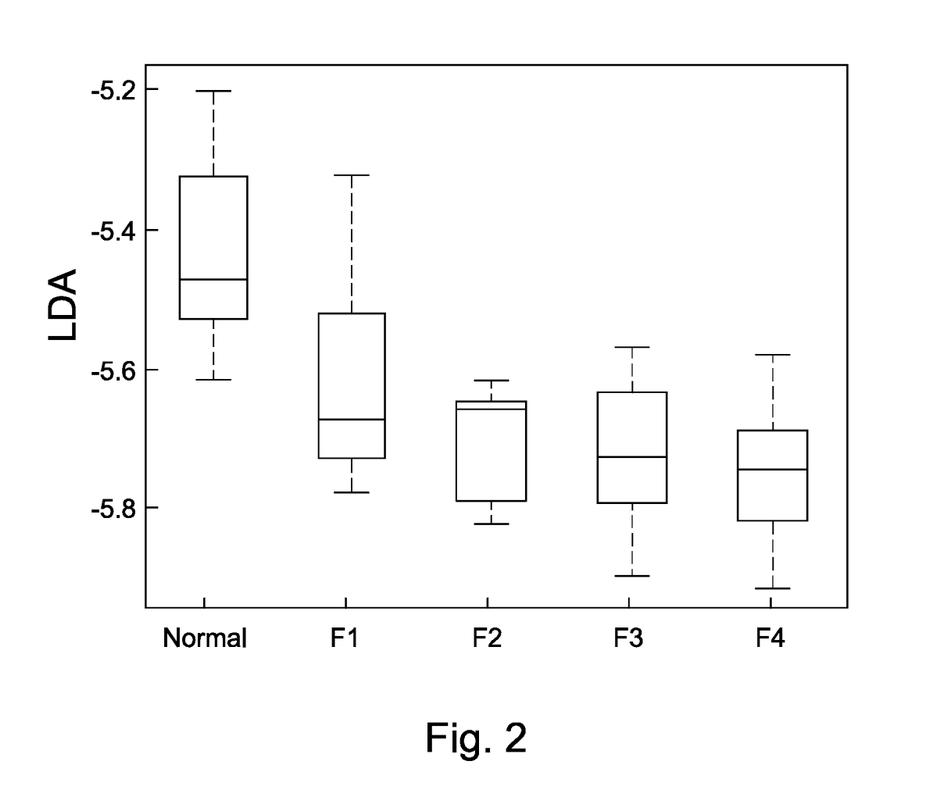
FIG. 2 is a drawing illustrating accuracy in determining liver fibrosis of 65 patients with significant fatty liver.

Referring to FIG. 2 which illustrates diagnostic accuracy of liver fibrosis for 65 significant patients with significant fatty liver. As shown in FIG. 2, n=65 represents 65 significant fatty liver cases; the ordinate is the weighted parameter, the abscissa is the fibrosis score, "normal" means no fibrosis; "F1" means 1 point for fibrosis; "F2" means 2 points for fibrosis; "F3" means 3 points for fibrosis; "F4" means liver cirrhosis. In the discriminant function of this embodiment, the weight of the Nakagami parameter is 1; the weight of the homodyned K parameter is 0.04; the weight of the information theory entropy parameter is −7.96. The set threshold is −5.6. If the new parameter value is higher than the set threshold, it will be judged as no fibrosis detected. If it is lower than the set threshold, it will be judged as fibrosis detected. Under this discriminant function, the classification accuracy can reach 90.8%. In an embodiment, the set threshold above is found through a statistical method called Area Under the Receiver Operating Characteristic curve (AUROC).

As the amount of measured data increases, the individual weights of Nakagami parameters, homodyned K parameters, and information theory entropy parameters obtained by linear discriminant analysis will change, so the data training module 500 can be used to continuously modify the discriminant function, and the revised discriminant function is provided to the classification module 400 to improve the accuracy of the judgment.

Figure 3:
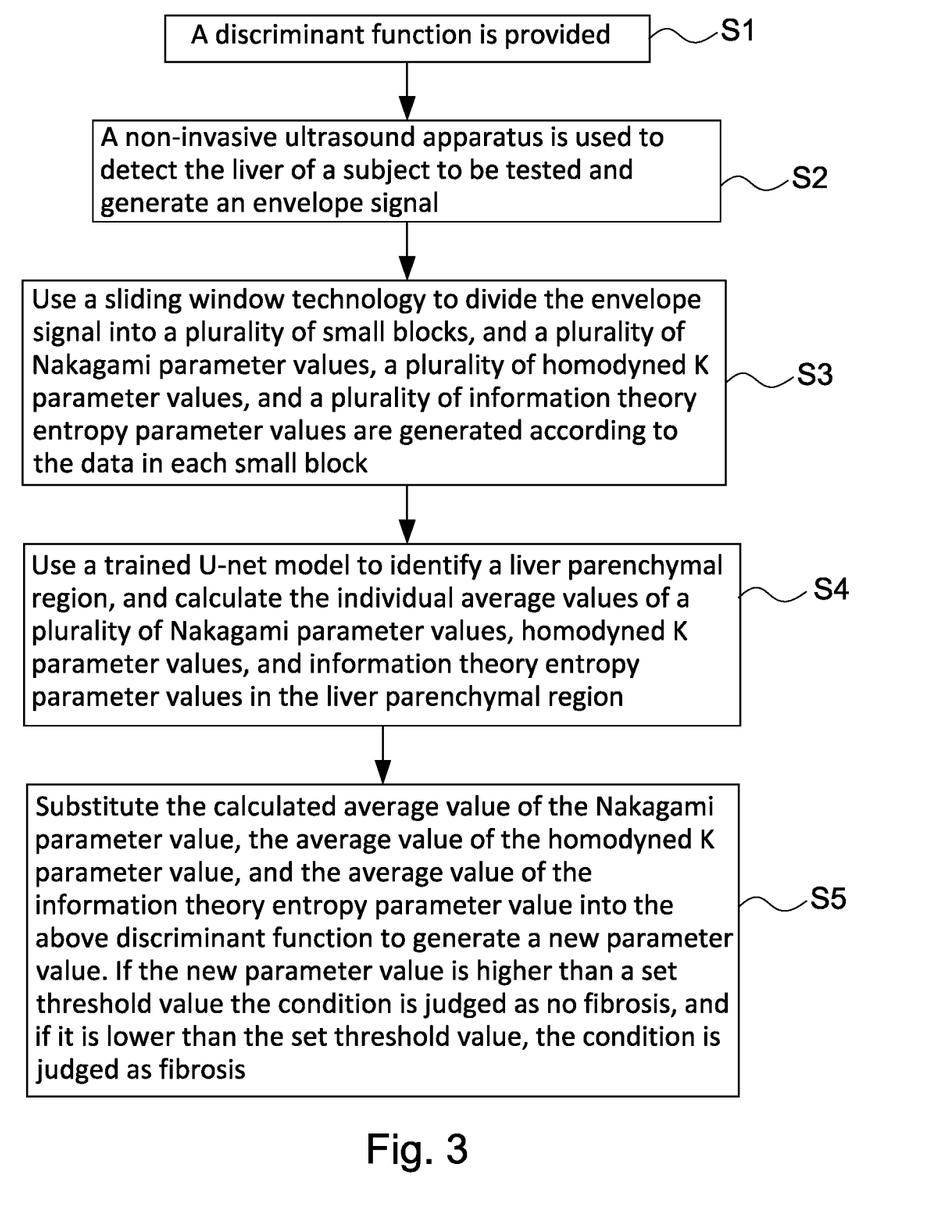
FIG. 3 is a flowchart illustrating the non-invasive ultrasound detection method of detecting liver fibrosis according to an embodiment of the present invention.

Please refer to FIG. 3. An embodiment of the present invention comprises a computer-implemented non-invasive ultrasound detection method for detecting liver fibrosis. As shown in FIG. 3, the computer-implemented non-invasive ultrasound detection method for detecting liver fibrosis includes the following steps:

Step S1: Provide a discriminant function, where the discriminant function is composed of three variables representing the Nakagami parameter, the homodyned K parameter, and the information theory entropy parameter, each multiplied by different weights and then added together.

Step S2: A non-invasive ultrasound apparatus is used to detect the liver of a subject to be tested and generate an envelope signal. In this step, the subject is, for example, a fatty liver patient, especially a patient with a significant fatty liver condition.

Step S3: Using a sliding window technology, the envelope signal is divided into a plurality of small blocks, and a plurality of Nakagami parameter values, a plurality of homodyned K parameter values, and a plurality of information theory entropy parameter values are generated according to the data in each small block. In this step, the generated plurality of Nakagami parameter values, homodyned K parameter values, and information theory entropy parameter values are basically a parameter matrix, which is a so-called parameter image after color matching.

Step S4: Use a trained U-net model to identify a liver parenchymal region, and calculate the individual average values of a plurality of Nakagami parameter values, homodyned K parameter values, and information theory entropy parameter values in the liver parenchymal region. In other embodiments, other deep learning models and other statistical models are used.

Step S5: Substitute the calculated average value of the Nakagami parameter value, the average value of the homodyned K parameter value, and the average value of the information theory entropy parameter value into the above discriminant function to generate a new parameter value. If the new parameter value is higher than a set threshold value the condition is judged as no fibrosis, and if it is lower than the set threshold value, the condition is judged as fibrosis.

In another embodiment, the average value of Nakagami parameter values, the average value of homodyned K parameter values, and the average value of information theory entropy parameter values can be calculated based on the latest sample number of the tested persons with known liver fibrosis scores. All numerical results are based on liver fibrosis scores as the diagnostic label, and the individual weights of Nakagami parameters, homodyned K parameters, and information theory entropy parameters are obtained by linear discriminant analysis, and the above discriminant function is routinely modified. That is to say, as the amount of measured data increases, the individual weights of the Nakagami parameters, homodyned K parameters, and information theory entropy parameters obtained by linear discriminant analysis will also change. The above discriminant function can be continuously modified to improve the judgment accuracy.

In addition, in an embodiment of the present invention, the information theory entropy parameter is normalized. Two parameters are introduced in the normalization process, one representing no fatty liver, and the other representing heavy fatty liver. The normalization process of the information theory entropy parameter comprises dividing a information theory entropy parameter to a theoretical entropy reference value, and the reference value may be an information theory entropy value of the pre-Rayleigh distribution data (representing no fatty liver), or may be an information theory entropy value of the Raleigh distribution data (representing severe fatty liver).

What is claimed is:

1. A non-invasive ultrasound detection device for detecting liver fibrosis, including:
   a non-invasive ultrasound apparatus that detects a liver and generates an envelope signal;
   a data processing apparatus that is electrically connected to the non-invasive ultrasound apparatus and programmed to perform a parameter value generation module, a parameter calculation module, a classification module, and a data training module, wherein: the parameter value generation module uses a sliding window technology to divide the envelope signal into a plurality of small blocks, and uses a Nakagami statistical model, a homodyned K statistical model and information theory entropy according to data in each small block to generate a plurality of Nakagami parameter values, a plurality of homodyned K parameter values, and a plurality of information theory entropy parameter values based on the data in each small block;

the parameter calculation module with a trained U-net model, communicating with the parameter value generation module, is configured to identify a parenchymal region of the liver and calculate individual average values of the Nakagami parameter values, homodyned K parameter values, and the information theory entropy parameter values in the parenchymal region of the liver; and the classification module contains a discriminant function provided by a data training module, wherein the discriminant function shows as (Nakagami parameter× weight 1)+(homodyned K parameter×weight 2)+(information theory entropy parameter×weight 3), and wherein the average value of the Nakagami parameters, the average value of the homodyned K parameters, and the average value of the information theory entropy parameters calculated by the parameter calculation module are substituted into the discriminant function to generate a new parameter value; if the new parameter value is higher than a set threshold, condition is judged as no fibrosis, and if the new parameter value is lower than the set threshold, condition is judged as fibrosis.

2. The non-invasive ultrasound detection device for detecting liver fibrosis as recited in claim 1, wherein the data training module individually averages the Nakagami parameter values, the homodyned K parameter values, and the information theory entropy parameter values of a plurality of tested individuals with known degrees of liver fibrosis, and performs linear discriminant analysis to obtain respective weight parameters for the Nakagami parameter, the homodyned K, and the information theory entropy parameter for the discriminant function; and wherein the set threshold is −5.6.

3. The non-invasive ultrasound detection device for detecting of liver fibrosis as recited in claim 1, wherein the information theory entropy parameter is normalized.

4. A computer-implemented non-invasive ultrasound detection method for detecting liver fibrosis, including the following steps:
providing by a data processing apparatus, a discriminant function, wherein the discriminant function is composed of three variables representing a Nakagami parameter, a homodyned K parameter, and an information theory entropy parameter, each multiplied by different weights, and then combined;
using a non-invasive ultrasound apparatus to detect a liver and generate an envelope signal;
using a sliding window technology to divide, by the data processing apparatus, the envelope signal into a plurality of small blocks, and a plurality of Nakagami parameter values, a plurality of homodyned K parameter values, and a plurality of information theory entropy parameter values are generated according to data in each small block;
using a trained U-net model to identify, by the data processing apparatus, a parenchymal region of the liver, and calculate individual average values of the Nakagami parameter values, the homodyned K parameter values, and the information theory entropy parameter values in the parenchymal region of the liver; and
substituting, by the data processing apparatus, the calculated average value of the Nakagami parameter values, the average value of the homodyned K parameter values, and the average value of the information theory entropy parameter values into the discriminant function to generate a new parameter value; if the new parameter value is higher than a set value threshold, condition is judged as no fibrosis, if the new parameter is lower than the set threshold, condition is judged as fibrosis.

5. The computer-implemented non-invasive ultrasound detection method for detecting liver fibrosis as recited in claim 4, wherein the discriminant function is obtained by performing linear discriminant analysis to obtain respective weight parameters for the Nakagami parameter, the homodyned K parameter, and the information theory entropy parameter, based on the average value of the Nakagami parameter values, the average value of the homodyned K parameter values, and the average value of the information theory entropy parameter values of a plurality of tested individuals with known degrees of liver fibrosis; and wherein the set threshold is −5.6.

6. The computer-implemented non-invasive ultrasound detection method for detecting liver fibrosis as recited in claim 4, wherein the information theory entropy parameter is normalized.

7. A computer-implemented non-invasive ultrasound detection method for detecting liver fibrosis, including:
obtaining, by a data processing apparatus, a discriminant function, wherein individual average values of different statistical model parameter values in a parenchymal area of a liver are calculated according to liver ultrasound images of multiple tested subjects with known degrees of liver fibrosis, and individual weights of different statistical model parameters are obtained by linear discriminant analysis to obtain the discriminant function, wherein the discriminant function shows as (Nakagami parameter×weight 1)+(homodyned K parameter× weight 2)+(information theory entropy parameter× weight 3), wherein different statistical models include Nakagami statistical model and homodyned K statistical model that are used to identify liver fibrosis or fatty liver respectively; and
calculating, by the data processing apparatus, the individual average values of the different statistical model parameter values in the parenchymal area of the liver based on an ultrasound image of the liver of a subject, and substituting them into the discriminant function to generate a new parameter value, and comparing it with a set threshold to determine whether there is liver fibrosis.

8. The computer-implemented non-invasive ultrasound detection method for detecting liver fibrosis as recited in claim 7, wherein at least one of the statistical model parameters is normalized; and wherein the set threshold is −5.6.

* * * * *